United States Patent
Banasiak et al.

(10) Patent No.: US 9,079,553 B2
(45) Date of Patent: Jul. 14, 2015

(54) SCALABLE CRUSH CAN FOR VEHICLE

(75) Inventors: Gary Banasiak, Troy, MI (US); James R. Byrne, II, Shelby Township, MI (US); Alexander Zak, Troy, MI (US); Seetarama S. Kotagiri, Rochester Hills, MI (US)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 13/876,592

(22) PCT Filed: Sep. 27, 2011

(86) PCT No.: PCT/CA2011/001089
§ 371 (c)(1),
(2), (4) Date: May 13, 2013

(87) PCT Pub. No.: WO2012/040826
PCT Pub. Date: Apr. 5, 2012

(65) Prior Publication Data
US 2013/0300138 A1 Nov. 14, 2013

Related U.S. Application Data

(60) Provisional application No. 61/387,119, filed on Sep. 28, 2010.

(51) Int. Cl.
*B60R 19/34* (2006.01)
(52) U.S. Cl.
CPC ........... *B60R 19/34* (2013.01); *Y10T 29/49622* (2015.01)
(58) Field of Classification Search
CPC ....... B60R 19/34; B01J 2523/00; B01J 23/50; B30B 9/321; C07C 67/04; Y10S 100/902; A61L 15/28; F16F 7/12
USPC .......... 293/133; 100/215, 295, 902, 218, 233, 100/293; 296/187.03, 187.09
See application file for complete search history.

(56) References Cited

U.S. PATENT DOCUMENTS

| | | | | |
|---|---|---|---|---|
| 3,842,222 A | * | 10/1974 | Hogland | 200/61.44 |
| 4,465,312 A | * | 8/1984 | Werner | 293/132 |
| 5,397,021 A | * | 3/1995 | Usui | 220/667 |
| 5,431,445 A | * | 7/1995 | Wheatley | 280/784 |
| 5,853,195 A | * | 12/1998 | Le et al. | 280/784 |
| 5,876,077 A | * | 3/1999 | Miskech et al. | 293/132 |
| 5,876,078 A | * | 3/1999 | Miskech et al. | 293/133 |
| 6,152,521 A | * | 11/2000 | Hayashi et al. | 296/187.09 |
| 6,174,009 B1 | * | 1/2001 | McKeon | 293/133 |
| 6,179,355 B1 | * | 1/2001 | Chou et al. | 293/132 |
| 6,474,709 B2 | * | 11/2002 | Artner | 293/133 |
| 6,588,830 B1 | * | 7/2003 | Schmidt et al. | 296/187.09 |

(Continued)

FOREIGN PATENT DOCUMENTS

| | | |
|---|---|---|
| DE | 102004020746 A1 | 12/2005 |
| EP | 1 398 224 A1 | 3/2004 |
| WO | 2006113608 A2 | 10/2006 |

*Primary Examiner* — Kiran B Patel
(74) *Attorney, Agent, or Firm* — Dickinson Wright PLLC

(57) ABSTRACT

In one aspect, the invention is directed to a crush can for a vehicle frame including a crush can body having a longitudinal axis and a cross-sectional shape that is at least approximately a 10-sided polygon. In another aspect, the invention is directed to a crush can for a vehicle frame including a crush can body having a longitudinal axis and a cross-sectional shape that includes a plurality of outwardly pointing apexes and a plurality of inwardly pointing apexes.

12 Claims, 14 Drawing Sheets

(56) References Cited

U.S. PATENT DOCUMENTS

| | | | |
|---|---|---|---|
| 6,595,502 B2 * | 7/2003 | Koch et al. | 267/139 |
| 6,808,215 B2 * | 10/2004 | Sakuma et al. | 293/102 |
| 6,820,924 B2 * | 11/2004 | Caliskan et al. | 296/187.03 |
| 6,929,297 B2 * | 8/2005 | Muller et al. | 293/133 |
| 7,357,432 B2 * | 4/2008 | Roll et al. | 293/133 |
| 7,389,860 B2 * | 6/2008 | Abu-Odeh et al. | 188/377 |
| 7,413,226 B2 * | 8/2008 | Muskos | 293/133 |
| 7,488,016 B2 * | 2/2009 | Nakamae et al. | 293/117 |
| 7,677,617 B2 * | 3/2010 | Stewart et al. | 293/133 |
| 7,717,465 B2 * | 5/2010 | Hedderly | 280/784 |
| 8,308,207 B2 * | 11/2012 | Fang et al. | 293/132 |
| 8,336,933 B2 * | 12/2012 | Nagwanshi et al. | 293/132 |
| 8,376,427 B2 * | 2/2013 | Perarnau Ramos et al. | 293/133 |
| 8,459,726 B2 * | 6/2013 | Tyan et al. | 296/187.03 |
| 8,539,737 B2 * | 9/2013 | Tyan et al. | 52/843 |
| 8,641,129 B2 * | 2/2014 | Tyan et al. | 296/187.03 |
| 8,662,546 B2 * | 3/2014 | Kizaki et al. | 293/133 |
| 8,690,208 B2 * | 4/2014 | Ghannam et al. | 293/133 |
| 8,720,961 B2 * | 5/2014 | Han | 293/133 |
| 2006/0237976 A1 * | 10/2006 | Glasgow et al. | 293/132 |
| 2007/0056819 A1 * | 3/2007 | Kano et al. | 188/371 |
| 2007/0187960 A1 * | 8/2007 | Evans | 293/133 |
| 2008/0012386 A1 * | 1/2008 | Kano et al. | 296/187.03 |
| 2008/0098601 A1 * | 5/2008 | Heinz et al. | 29/897.2 |
| 2008/0106107 A1 * | 5/2008 | Tan et al. | 293/133 |
| 2008/0224487 A1 * | 9/2008 | Wang et al. | 293/132 |
| 2008/0238146 A1 * | 10/2008 | Nusier et al. | 296/193.09 |
| 2009/0026777 A1 * | 1/2009 | Schmid et al. | 293/133 |
| 2010/0072788 A1 | 3/2010 | Tyan et al. | |
| 2011/0015902 A1 * | 1/2011 | Cheng et al. | 703/1 |

* cited by examiner

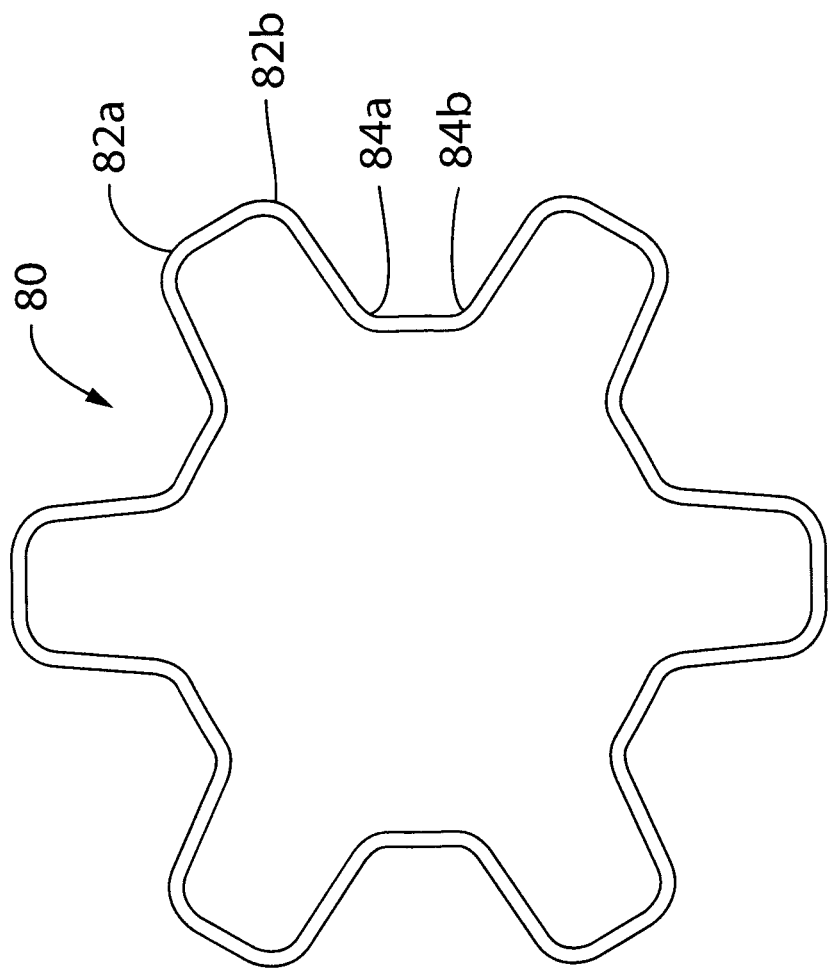

SCALABLE CRUSH CAN FOR VEHICLE

CROSS REFERENCE TO RELATED APPLICATIONS

This U.S. National Stage Patent Application claims the benefit of International Application Serial No. PCT/CA2011/001089 filed Sep. 27, 2011 entitled "Scalable Crush can For Vehicles" which claims priority to U.S. Provisional Patent Application Ser. No. 61/387,119 filed Sep. 28, 2010, the entire disclosures of the applications being considered part of the disclosure of this application, and hereby incorporated by reference.

FIELD OF THE INVENTION

The present invention relates to a crush cans for vehicles, and more particularly to a crush can that is scalable for use on a plurality of models of vehicles having different masses, crush specifications and other parameters.

BACKGROUND OF THE INVENTION

Vehicle structures sometimes include an element referred to as a crush can. The crush can is typically a member that mounts between the vehicle's bumper and the vehicle frame, and provides a region for controlled energy absorption in the event of a collision, so as to inhibit the collision energy from entering the passenger cabin or damaging the vehicle frame. The crush cans used on vehicle structures currently typically needed to be custom-designed for different vehicles, particularly if the different vehicles had different weights and/or different crush resistance requirements. However, having several custom-designed crush cans is costly in terms of consuming technical resources and inventory.

It would be beneficial to provide a crush can configuration that was easily scalable to fit different vehicles with different weights and different crush resistance requirements.

SUMMARY OF THE INVENTION

In one aspect, the invention is directed to a crush can for a vehicle frame including a crush can body having a longitudinal axis and a cross-sectional shape that is at least approximately a 10-sided polygon.

In another aspect, the invention is directed to a crush can for a vehicle frame including a crush can body having a longitudinal axis and a cross-sectional shape that includes a plurality of outwardly pointing apexes alternating with a plurality of inwardly pointing apexes.

In another aspect, the invention is directed to a crush can for a vehicle frame including a crush can body having a longitudinal axis and a cross-sectional shape that includes a plurality of outwardly pointing apexes and a plurality of inwardly pointing apexes.

In another aspect, the invention is directed to a crush can for a vehicle frame including a crush can body having a longitudinal axis and a cross-sectional shape formed by a wall including at least two wall portions that abut each other. The wall portions that are in abutment may optionally be joined together. The wall portions that are in abutment may separate a first hollow shape, (e.g., a central hollow shape) from a second hollow shape (e.g., a distal hollow shape). The central hollow shape may include a plurality of apexes. The distal hollow shape may include one or more apexes.

In another aspect, the invention is directed to a method for forming a crush can including: extruding a crush can body having a cross-sectional shape that may include, for example, a central spine and a plurality of arms extending therefrom.

In another aspect, the invention is directed to a crush can for a vehicle frame including a crush can body having a longitudinal axis and a cross-sectional shape that is a non-hollow shape. The shape may include a central spine and a plurality of arms extending from the spine. The shape may include a plurality of apexes therein. In embodiments wherein the shape includes a central spine and a plurality of arms extending therefrom, the apexes may be provided as bends in the arms.

BRIEF DESCRIPTION OF THE DRAWINGS

The present invention will now be described by way of example only with reference to the attached drawings, in which:

FIG. 10 is a sectional end view of a crush can body in accordance with another embodiment of the present invention, which includes a plurality of outwardly pointing apexes and a plurality of inwardly pointing apexes, in a pattern of two outwardly pointing apexes alternating with two inwardly pointing apexes;

DETAILED DESCRIPTION OF THE INVENTION

Figure 1:
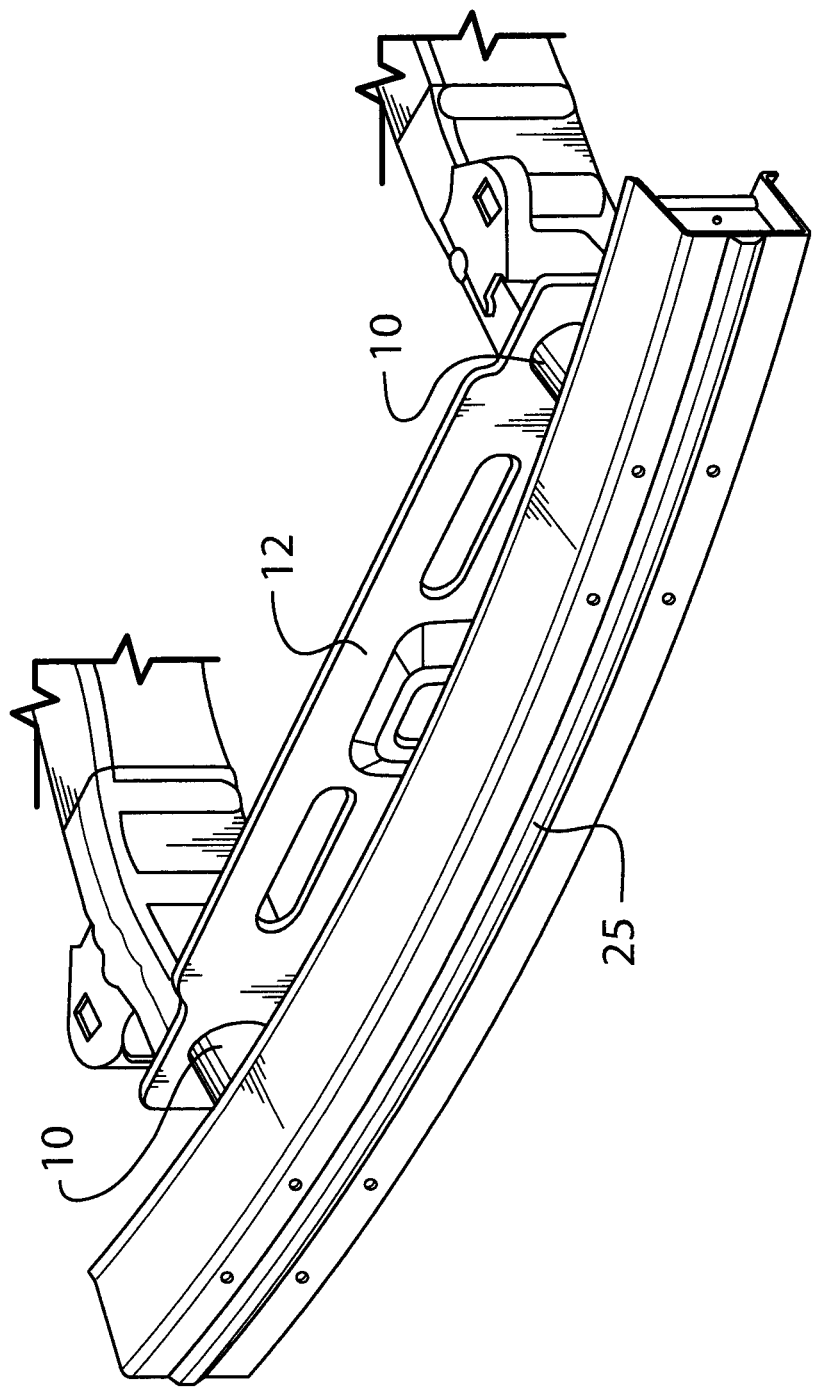
FIG. 1 is a perspective view of a portion of a vehicle frame with two crush cans thereon, which are in turn connected to a bumper, in accordance with an embodiment of the present invention.
Figure 2:
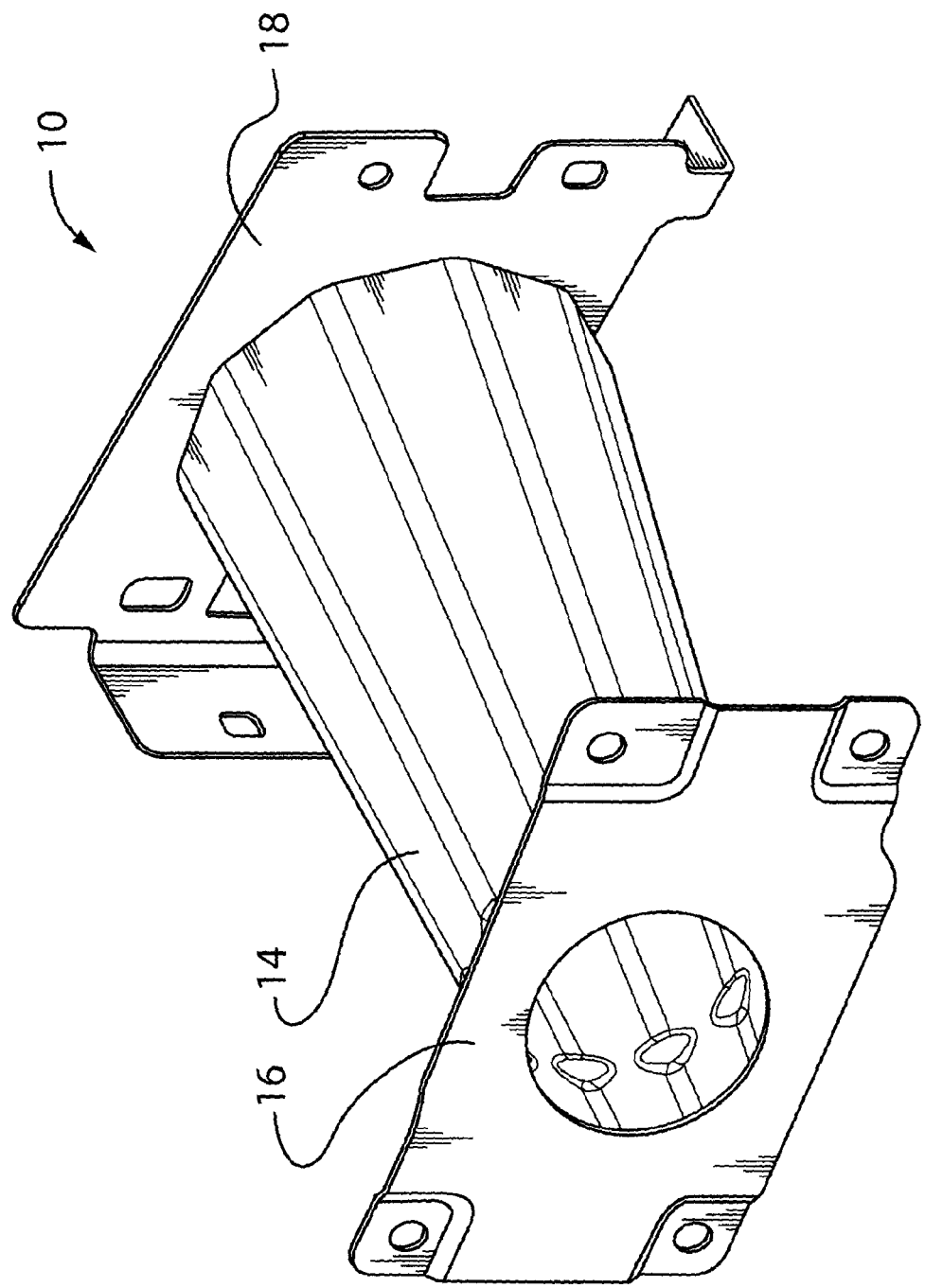
FIG. 2 is a perspective view of one of the crush cans shown in FIG. 1.
Figure 3:
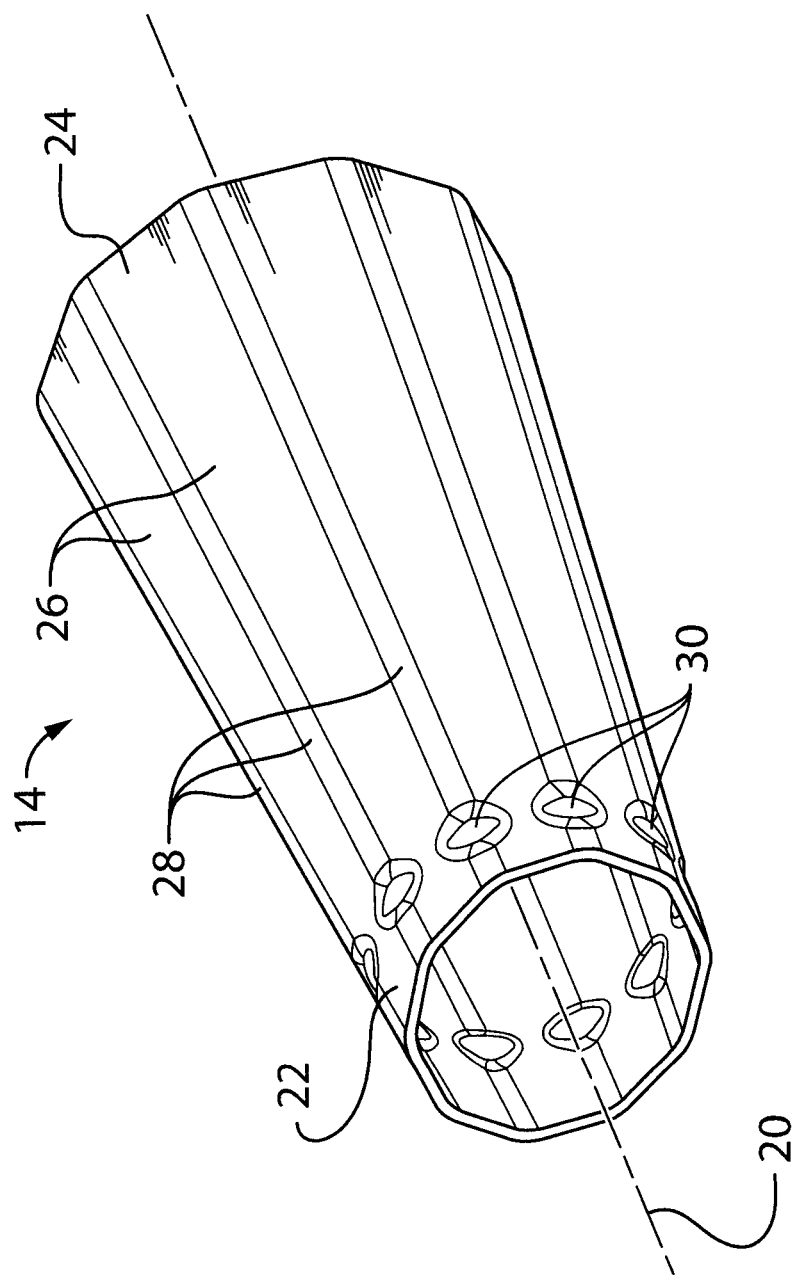
FIG. 3 is a perspective view of a crush can body from the crush can shown in FIG. 2.
Figure 4:
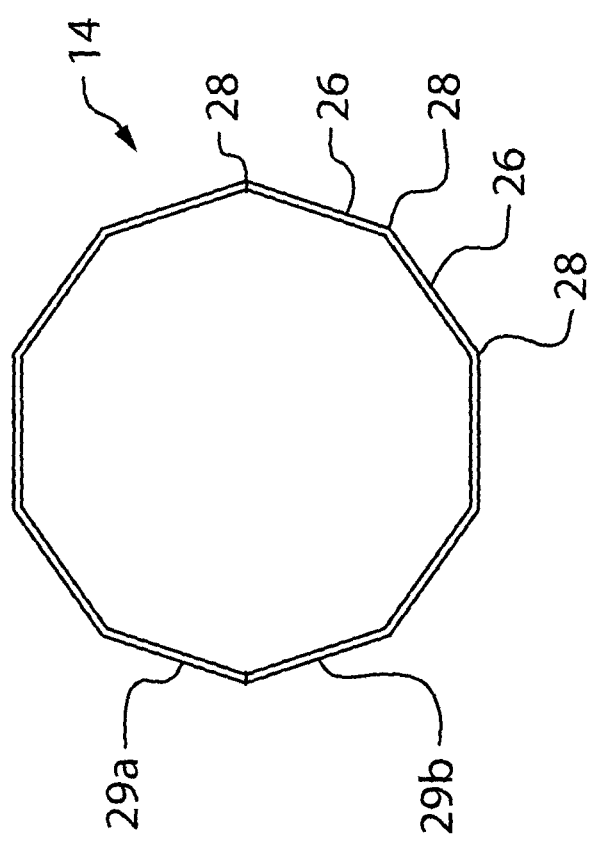
FIG. 4 is a sectional end view of the crush can body shown in FIG. 3.

Reference is made to FIG. 1, which shows a crush can 10 for use in absorbing collision energy during a vehicular collision. In the embodiment shown in FIG. 1, two crush cans 10 are provided between a vehicle frame shown at 12 and a bumper shown at 25. Referring to FIG. 2, the crush can 10 includes a crush can body 14, a front plate 16 and a rear plate 18. The crush can body 14 is shown more clearly in FIG. 3. The crush can body 14 has a longitudinal axis shown at 20. The longitudinal body 14 has a cross-sectional shape that is shown in FIG. 4. As can be seen in FIG. 3, the cross-sectional shape is a 10-sided polygon. In a preferred embodiment, the polygon is a regular polygon (ie. each of its 10 sides is the same width, and the angles between adjacent pairs of sides are all the same (36 degrees). In other words, the polygon in this embodiment is a regular decagon, albeit with rounded corners.

Figure 5:
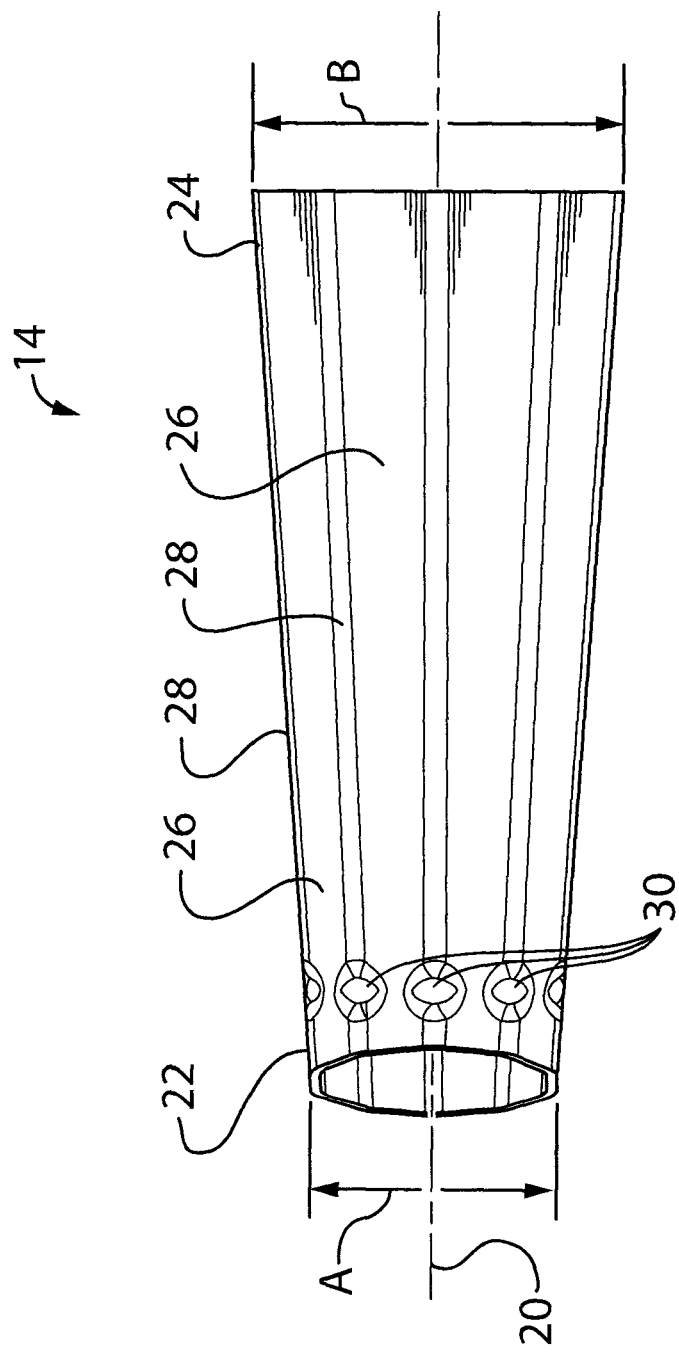
FIG. 5 is a side view of the crush can body shown in FIG. 3.

Referring to FIG. 5, the crush can body 14 may be tapered axially. The taper ratio for the crush can body 14 is the ratio of the cross-sectional dimension A at the front end (shown at 22) of the crush can body 14, to the cross-sectional dimension B at the rear end (shown at 24) of the crush can body 14. In embodiments wherein there is a taper to the crush can body 14 as shown in FIGS. 2 and 4, one end (e.g., end 22) is a small end, and one end (e.g., end 24) is a large end. The taper ratio may be any suitable value. In the exemplary embodiment shown in FIGS. 1-5, the taper ratio may be, for example, anywhere between about 0.5 (implying that dimension A is [½] of dimension B), and about 1 (implying that dimension A is the same as dimension B, which means that there is no taper).

As shown in FIG. 1, the bumper 25 may be curved such that it is not strictly perpendicular to the longitudinal axis 20 of the crush can 10. In order to facilitate mounting of the crush can 10 to the bumper 25, the front end 22 (FIG. 5) of the crush can body 14 may be angled to generally match the sweep of the bumper 25.

With reference to FIG. 3, the crush can body 14 may be made up of 10 planar forms 26 which meet at 10 apexes 28. The planar forms 26 make up the sides of the polygon. It will be noted that the planar forms need not be strictly planar. The apexes 28 in the embodiment shown in FIG. 3 are all outwardly pointing apexes. The apexes 28 of the polygon may be radiused depending on the method used to manufacture the crush can body 14. In a preferred embodiment, the radius of each apex 28 may be between about 2 and 10 times the thickness of the wall of the crush can body 14. The wall thickness of the crush can 10 may be substantially constant along its length, depending on how the crush can body 14 is manufactured. For example, in some embodiments, the crush can body 14 may be made by first forming two clamshell portions, shown at 29a and 29b in FIG. 4. The two clamshell portions 29a and 29b may each be formed from sheet material using a stamping machine, for example. The two portions 29a and 29b may then be joined together, such as by a weld. In other embodiments, the crush can body 14 may be formed by other methods, which would result in a wall thickness that varies along the axial length of the crush can body 14. For example, the crush can body 14 could be formed from a length of tubing that is hydroformed so that it has the desired polygonal cross-sectional shape and the desired taper. In such an embodiment, the wall thickness of the crush can body 14 would decrease as the cross-sectional dimension increased. It can nonetheless remain that the radius of each apex 28 is between 2 and 10 times the wall thickness, even if the wall thickness varies along the length of the crush can body 14.

The crush can 10 may include one or more buckling features 30, which may also be referred to as crush features. These features are positioned at a selected position on the crush can body 14 so that buckling is initiated at the selected position when the crush can 10 incurs a sufficiently large generally axially-directed compressive force (e.g., during a vehicular collision). As can be seen in FIGS. 3 and 5, the buckling features 30 may all be positioned at the same axial distance from the rear end 24 of the crush can body 14, such as at an axial position proximate the front end 22 of the crush can body 14. The buckling features 30 may be up of lateral deformations of the apexes 28, however any suitable structure may be provided as the buckling features. The lateral deformations that make up the buckling features 30 may be directed inwardly (i.e., towards the longitudinal axis 20) as shown in FIG. 3. While buckling features 30 are provided at one particular axial position, it is possible to provide buckling features 30 at a plurality of axial positions.

The front and rear plates 16 and 18 are used to mount the crush can 10 to the vehicle's bumper 25 (FIG. 1) and to the vehicle frame 12 (FIG. 1) respectively. The front and rear plates 16 and 18 may be made from any suitable material (e.g., steel) in any suitable way (e.g., stamping) may be joined to the crush can body 14 in any suitable way such as by welding.

It has been found, surprisingly, that, for most bumper sweep angles the 10 sided crush can 10 provides better energy absorption than either an 8 sided crush can or a 12 sided crush can of similar construction. It is theorized that as the number of corners in the cross-sectional shape of the crush can body increases, the amount of energy absorption that the crush can body is capable of increases. However, it is further theorized that as the number of corners increases beyond a certain value (e.g., 10 corners in a polygon wherein all the apexes are outwardly pointing), the crush can body progressively resembles a body having a circular (more accurately, an annular) cross-sectional shape, which is theorized not have as much capability to absorb energy as a shape having apexes.

It has been found that the crush can 10 is easily scalable in size and strength to handle the energy absorption requirements for a large range of vehicle sizes and weights. Some variables that can be controlled to assist in the scalability of the crush can 10 include the material properties, the wall thickness, the cross-sectional dimensions, the radius of curvature of the apexes and the taper ratio.

Figure 6:
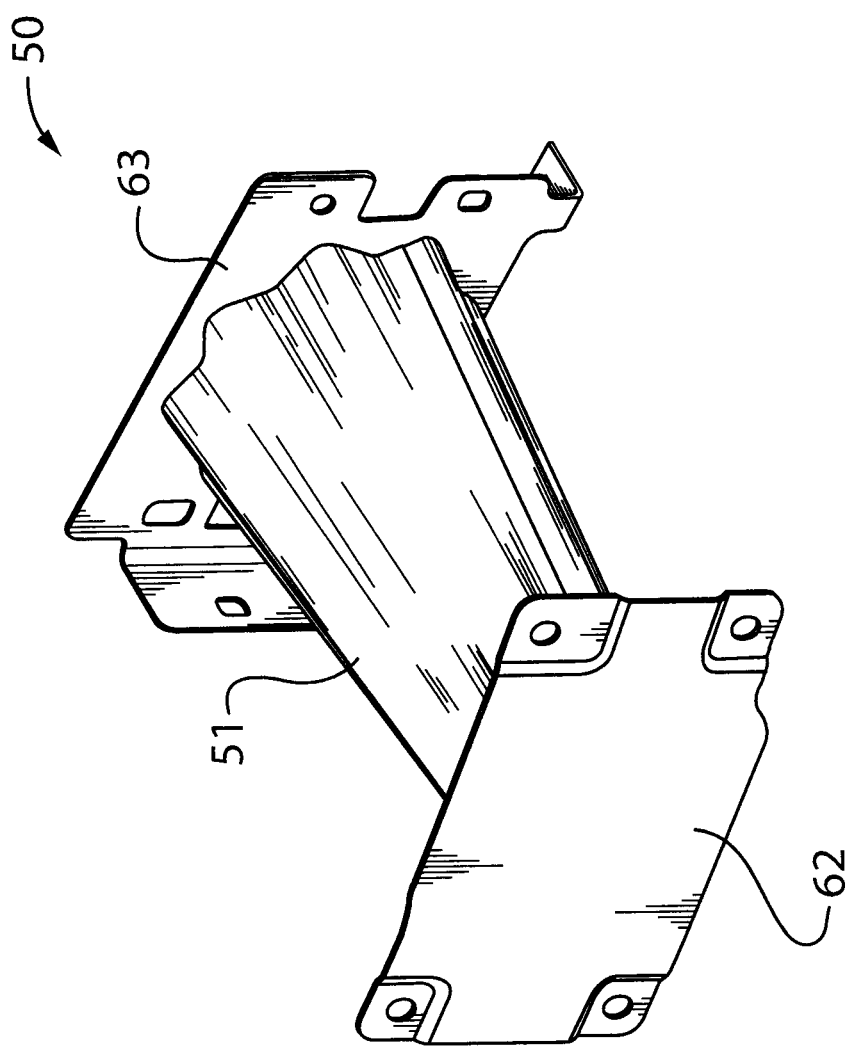
FIG. 6 is a perspective view of a crush can in accordance with another embodiment of the present invention, wherein the crush can has a body that includes a plurality of outwardly pointing apexes and a plurality of inwardly pointing apexes.
Figure 7:
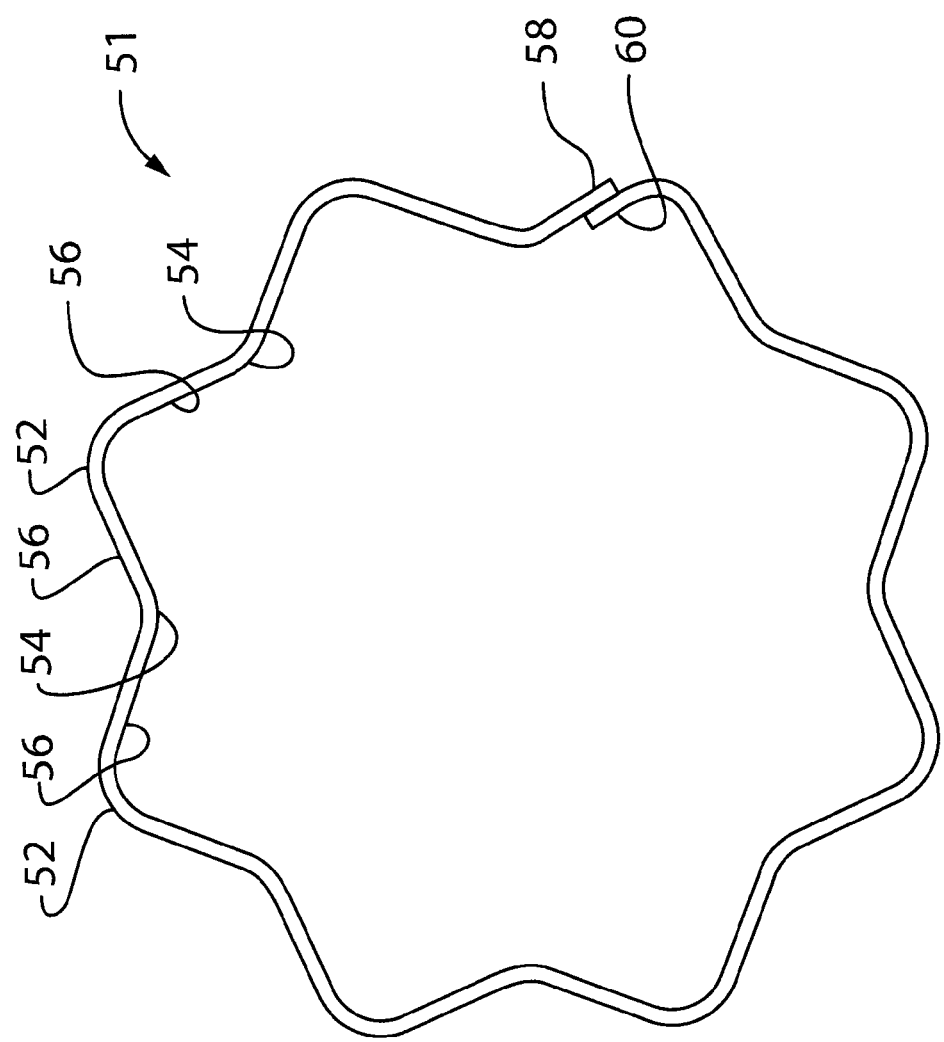
FIG. 7 is a sectional end view of a crush can body from the crush can shown in FIG. 6.

Reference is made to FIG. 6, which shows a crush can 50 in accordance with another embodiment of the present invention. The crush can 50 may be similar to the crush can 10 (FIG. 1), except that the crush can 50 includes a crush can body 51 that has a different cross-sectional shape which includes both outwardly pointing apexes 52 and inwardly pointing apexes 54, shown best in FIG. 7. The outwardly pointing apexes 52 and inwardly pointing apexes 54 alternate with each other in the embodiment shown in FIG. 7. Optionally, the crush can 50 includes planar forms 56 between the apexes 52 and 54 and is thus a generally star-shaped polygon, which is different than the polygon shape of the crush can body 14 shown in FIG. 4, which includes only outwardly pointing apexes 28. It has been found that the 8 pointed star shape shown in FIG. 7 provides superior energy absorption to the 10 sided polygon shape shown in FIG. 3. It will be noted that the cross-sectional shape of the crush can body 51 provides a relatively large number of apexes 52, 54 while having a relatively small cross-sectional dimension, which contributes positively to its strength relative to its size and weight.

The radius of each of the apexes 52 and 54 may be any suitable radius, such as, for example, between about 2 and 10 times the wall thickness of the crush can body 51.

The crush can 50 may be fabricated in any suitable way. For example, a single stamping made from a suitably shaped piece of sheet metal can provide the undulations that ultimately form the apexes 52 and 54 in the finished crush can body 51. The stamping includes a first edge portion shown at 58 and a second edge portion shown at 60 in FIG. 7. The first and edge portions 58 and 60 may be joined together in any suitable way. For example, as shown in FIG. 7, the edge portions 58 and 60 may be overlapped by some amount and welded, thereby completing the crush can body 51. Front and rear plates shown at 62 and 63 in FIG. 6 may be joined to the front end 64 and rear end 65 respectively of the completed crush can body 51. This process for manufacturing the crush can body 51 results in a wall thickness that is constant along its length. It will be understood that other manufacturing methods may alternatively be used to make the crush can body 50, such as hydroforming, or such as by welding two clamshell portions together.

Figure 8:
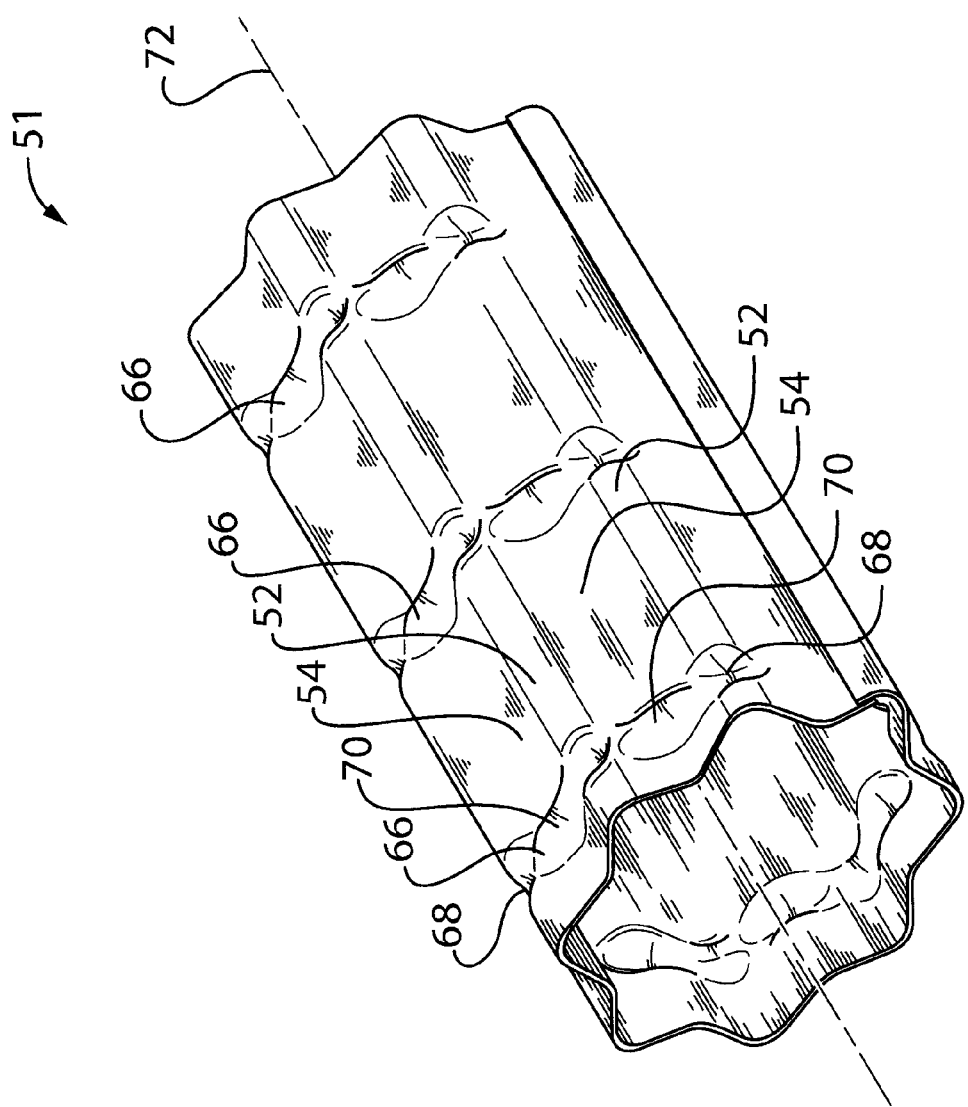
FIG. 8 is a perspective view of the crush can body shown in FIG. 7.

As can be seen in FIG. 8, the crush can body 51 includes buckling features 66 which are made up by lateral deformations of the apexes 52 and 54. The lateral deformations include inwardly directed lateral deformations 68 for apexes 52 and outwardly directed lateral deformations 70 for apexes 54. In the embodiment shown in FIG. 8, buckling features 66 are provided at three different axial positions along the length of the crush can body 51, including a forward position proximate the front end 64, a rearward position proximate the rear end 65 and a middle position proximate the longitudinal middle of the crush can body 51. The longitudinal axis of the crush can body 51 is shown at 72. Buckling features 66 are not provided along the seam formed by the welded edge portions 58 and 60.

Similarly to the crush can body 14 (FIG. 1), the crush can body 51 is tapered and has a front cross-sectional dimension A (see FIG. 9) at the front end shown at 74, a rear cross-sectional dimension B at the rear end shown at 76, and a taper ratio which is A/B which may be selected based on the crush resistance requirements of the particular vehicle on which the crush can 50 will be used. The taper ratio may be, for example, in the range of about 0.5 to about 1.

Figure 9:
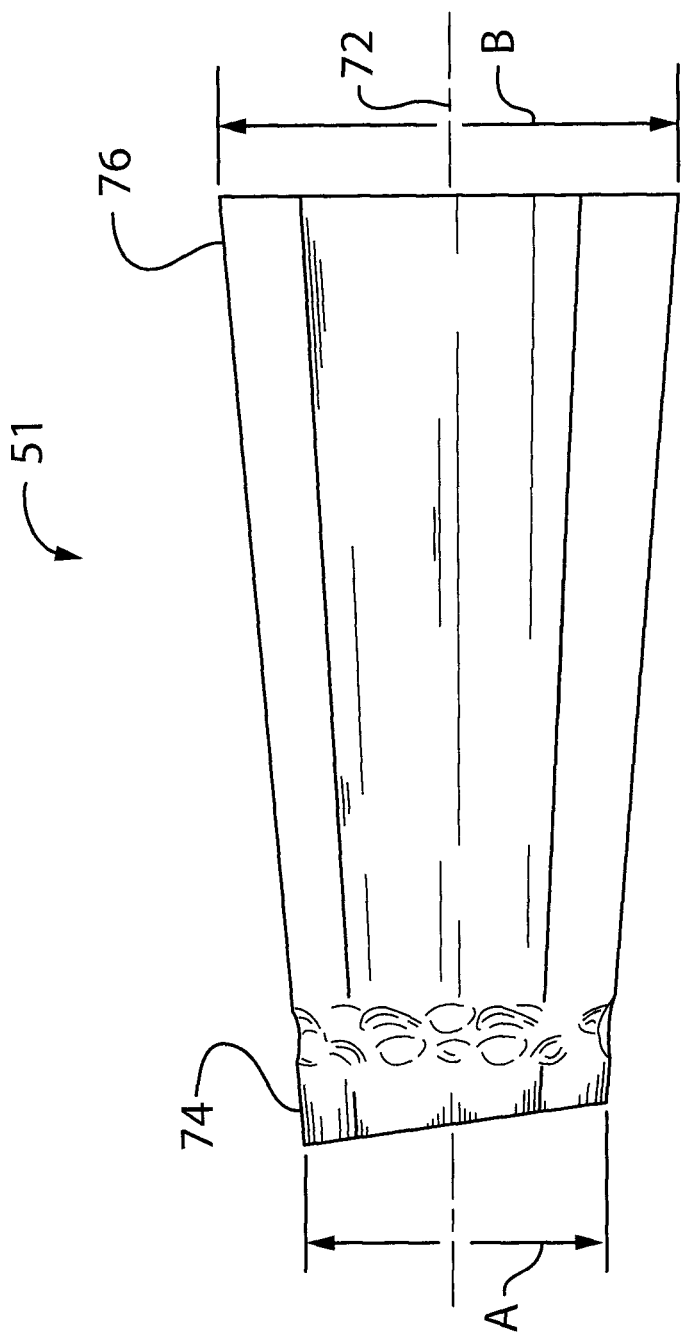
FIG. 9 is a side view of the crush can body shown in FIG. 7.

Also shown in FIG. 9, is the angled plane of the front end 74 of the crush can body 51 which may be provided to generally match the bumper sweep angle of the bumper (not shown) to which the crush can 50 will be attached during use. It is noted that the crush can body 51 shown in FIG. 9 is shown with only one ring of buckling features instead of 3 rings of buckling features as shown in FIG. 8.

In the embodiments shown in FIGS. 6-9, the crush can body 51 has a cross-sectional shape of an 8 pointed star. It is alternatively possible to provide a shape that has a different number of points. For example, the crush can body may have the shape of a 6-pointed star, an example of which is shown at 80 in FIG. 10. It will be noted that the crush can body 80, comprises an alternating arrangement of two outwardly pointing apexes 82a and 82b followed by two inwardly pointing apexes 84a and 84b.

Figure 11:
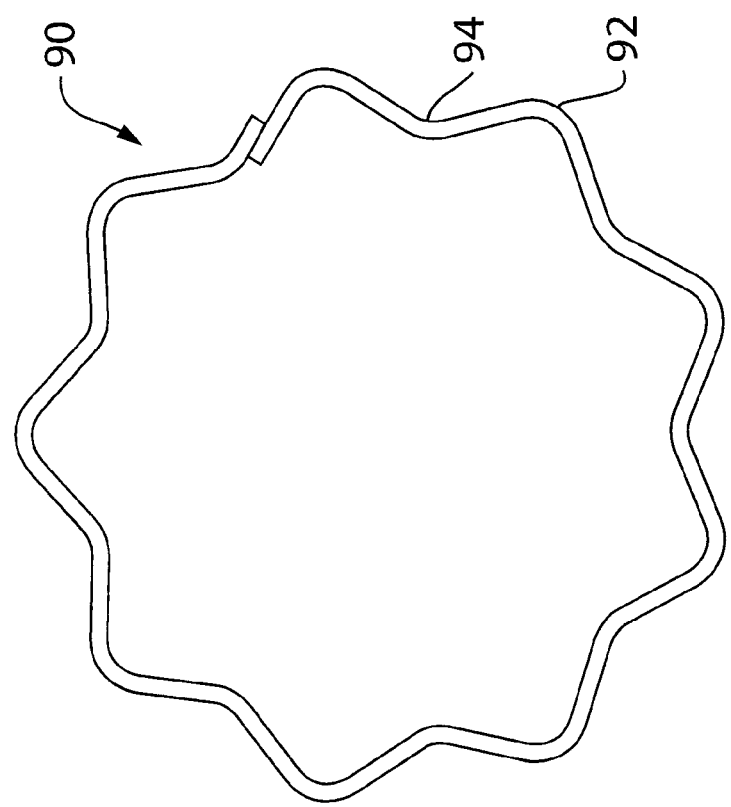
FIG. 11 is a sectional end view of a crush can body in accordance with another embodiment of the present invention, which includes a plurality of outwardly pointing apexes and a plurality of inwardly pointing apexes, wherein an odd number of each type of apex is provided.

In the embodiments described above, the crush can body had an even number of outwardly pointing apexes and an even number of inwardly pointing apexes. It is possible to provide a crush can body with an odd number of inwardly pointing apexes and an odd number of inwardly pointing apexes, an example of which is shown at 90 in FIG. 11, which has 9 outwardly pointing apexes 92 and 9 inwardly pointing apexes 94.

Figure 12:
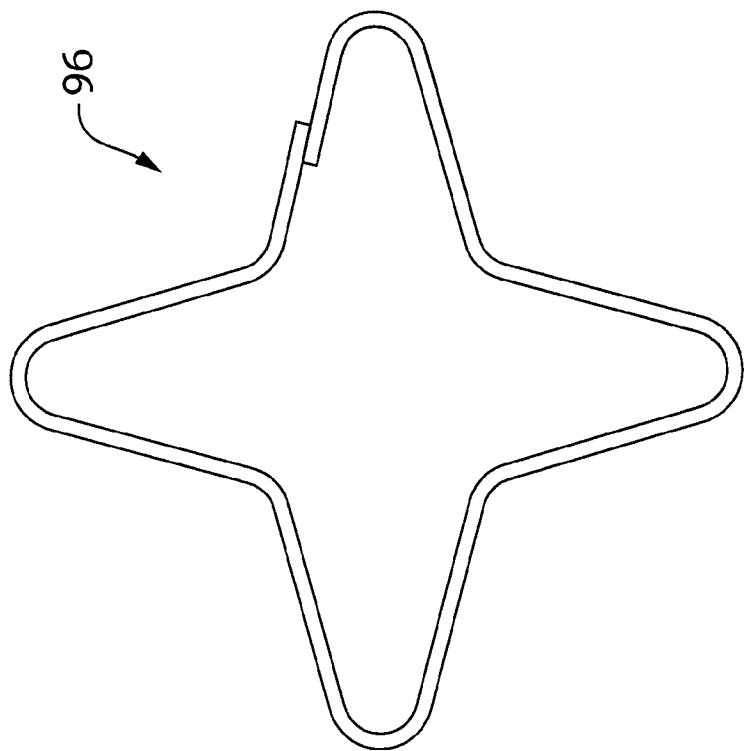
FIGS. 12-14 are sectional end views of crush can bodies in accordance with other embodiments of the present invention, each of which includes a plurality of outwardly pointing apexes and a plurality of inwardly pointing apexes.
Figure 14:
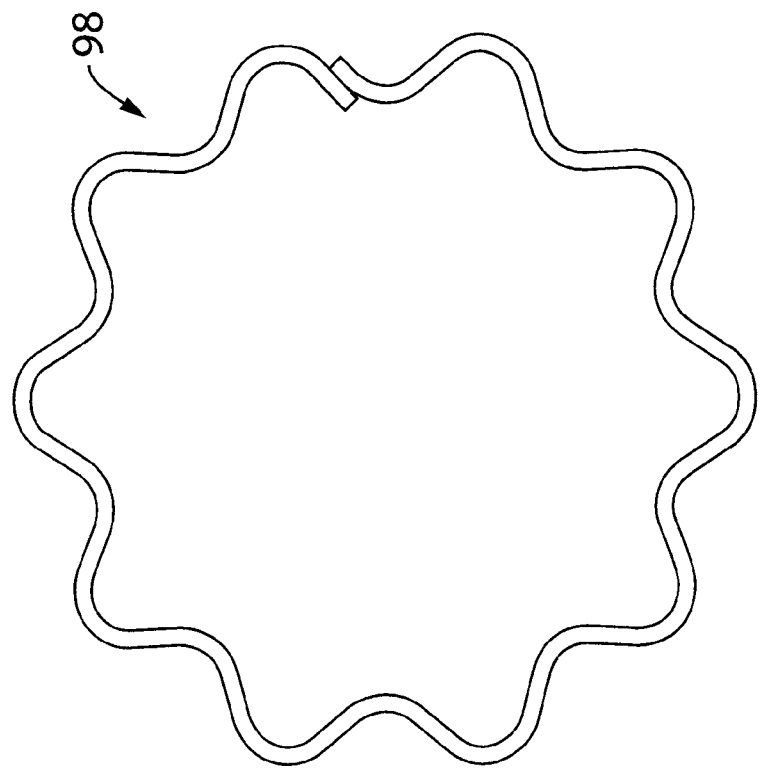
Figure 13:
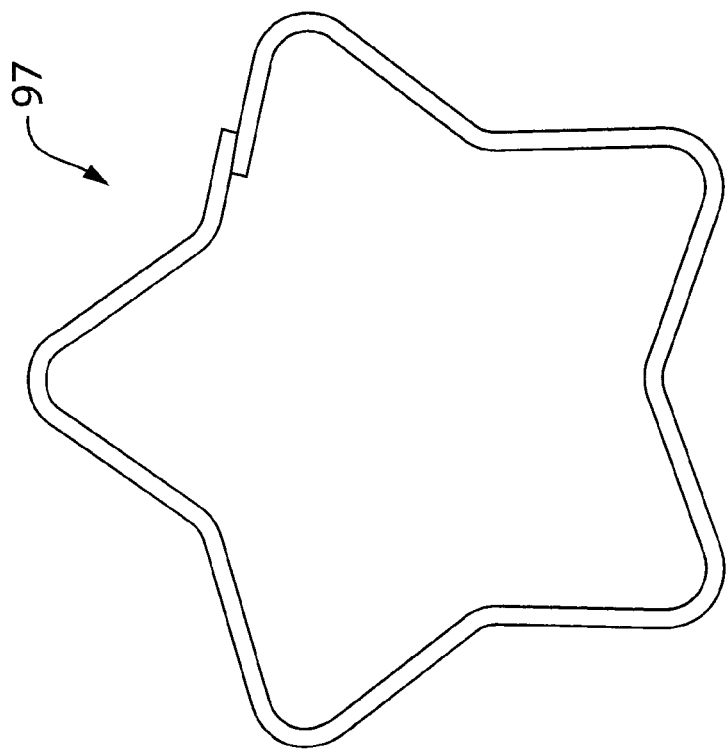

In other exemplary alternative embodiments, the crush can body may have the cross-sectional shape of a 4 pointed star, as shown at 96 in FIG. 12, a 5 pointed star as shown at 97 in FIG. 13, or a 10 pointed star as shown at 98 in FIG. 14. In each of these embodiments, the crush can body 80, 90, 96, 97 and 98 may be tapered axially, similar to the tapering of the crush can body 14 in FIG. 5. Each of the crush can bodies 80, 90, 96, 97 and 98 can be provided with other similar features shown for the crush can body 14 in FIG. 5, such as buckling features, and a front end that is angled to match the bumper sweep of the vehicle.

Figure 15:
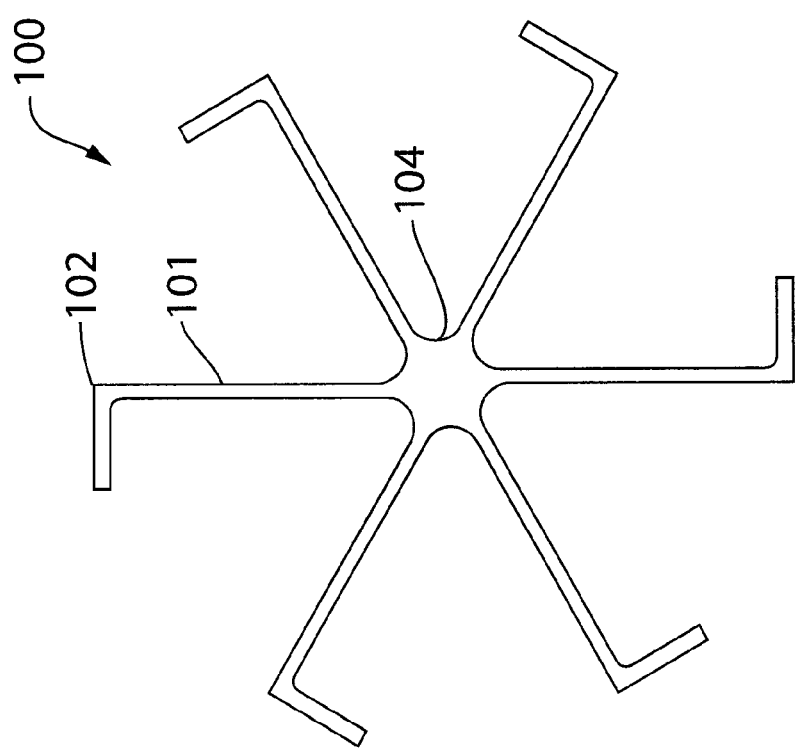
FIG. 15 is a sectional end view of a crush can body in accordance with another embodiment of the present invention, which includes a central spine and a plurality of arms extending therefrom, and which can be formed using an extrusion process.

In another alternative embodiment, the crush can body may be an extruded form, such as is shown at 100 in FIG. 15. The extruded form is, in this example, a non-hollow star shape, in contrast to the hollow shapes shown in FIGS. 1-14. The non-hollow star shape includes a plurality of arms 101 (in this case 6), each of which includes an apex shown at 102, and a central spine 104 from which the arms extend.

Figure 16:
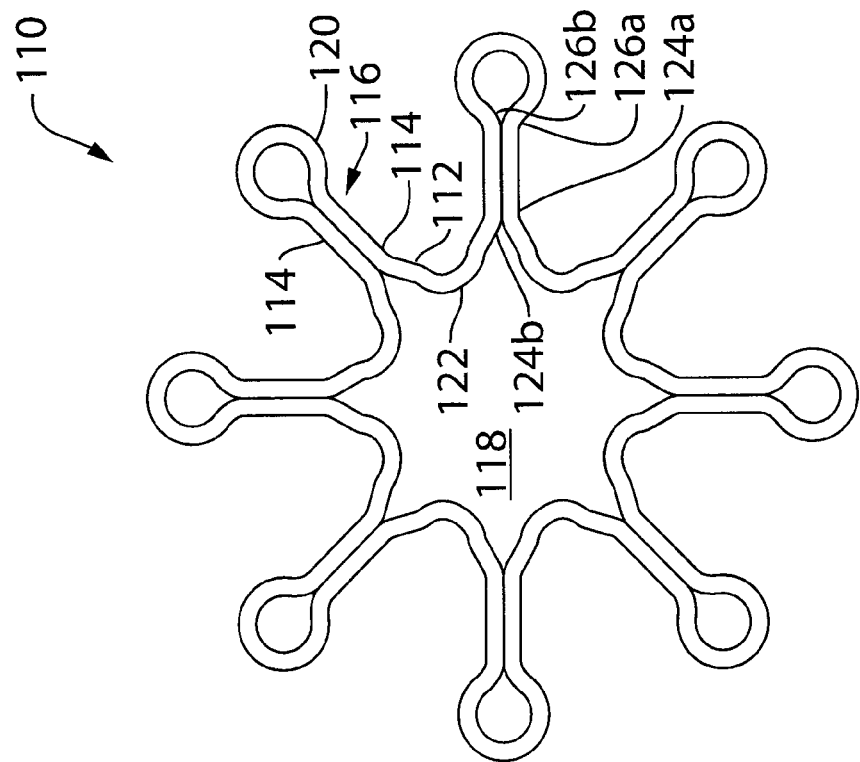
FIGS. 16-18 are sectional end views of crush can bodies in accordance with other embodiments of the present invention, each of which includes a wall, portions of which are in abutment with each other.

In yet another alternative embodiment, the crush can body may be a hollow star shape, as shown at 110 in FIG. 16, but with a wall 112 that has portions in abutment with other wall portions. Such portions are shown at 114. These abutting wall portions 114 act as reinforcements for each other, serving to strengthen the crush can body 110 and improve its energy absorption. Furthermore, these abutting wall portions 114 separate the crush can body 110 into a plurality of hollow shapes. In the embodiment shown in FIG. 16, the abutting wall portions form arms 116, which extend from a central hollow shape 118 and which have a hollow shape 120 at their distal ends. The distal hollow shape 120 may be generally circular, as shown in FIG. 16. The central hollow shape 118 may have a plurality of apexes therein, shown at 122 so as to improve the energy absorption of the crush can body 110. Immediately at the proximal and distal ends of the abutting wall portions 114 apexes are provided, as shown at 124a and 124b, and at 126a and 126b respectively.

Figure 17:
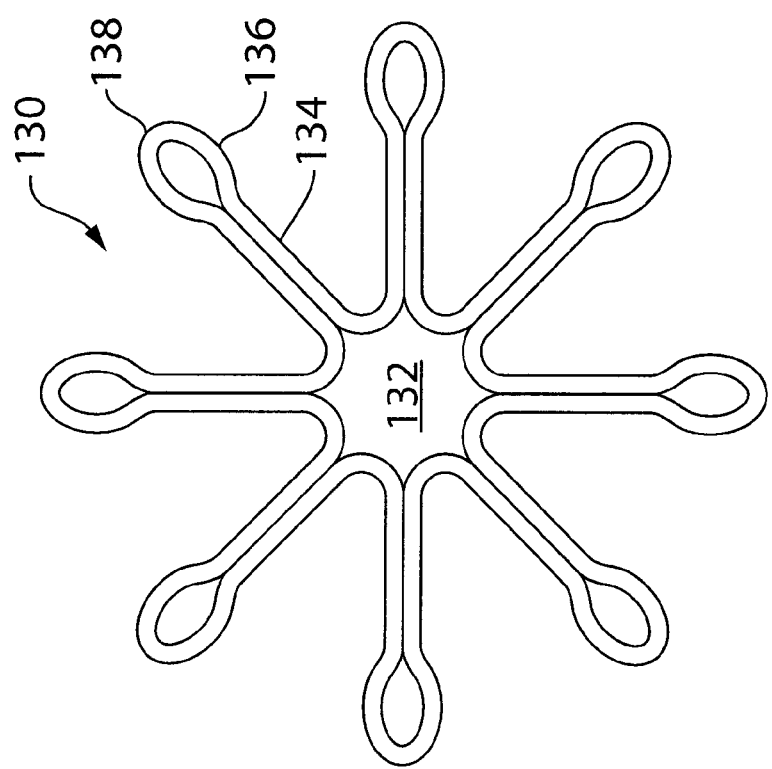

In a variant of the embodiment shown in FIG. 16, a crush can body 130 is shown in FIG. 17, in which the central hollow shape shown at 132 is relatively smaller and the arms, shown at 134 are relatively longer. Additionally, the distal hollow shapes, shown at 136, at the ends of the arms 134 are shown having a generally elliptical shape instead of a generally circular shape. At the distal ends of the ellipses, an apex 138 may be said to be provided, in addition to the apexes associated with the proximal and distal ends of the arms 134.

Figure 18:
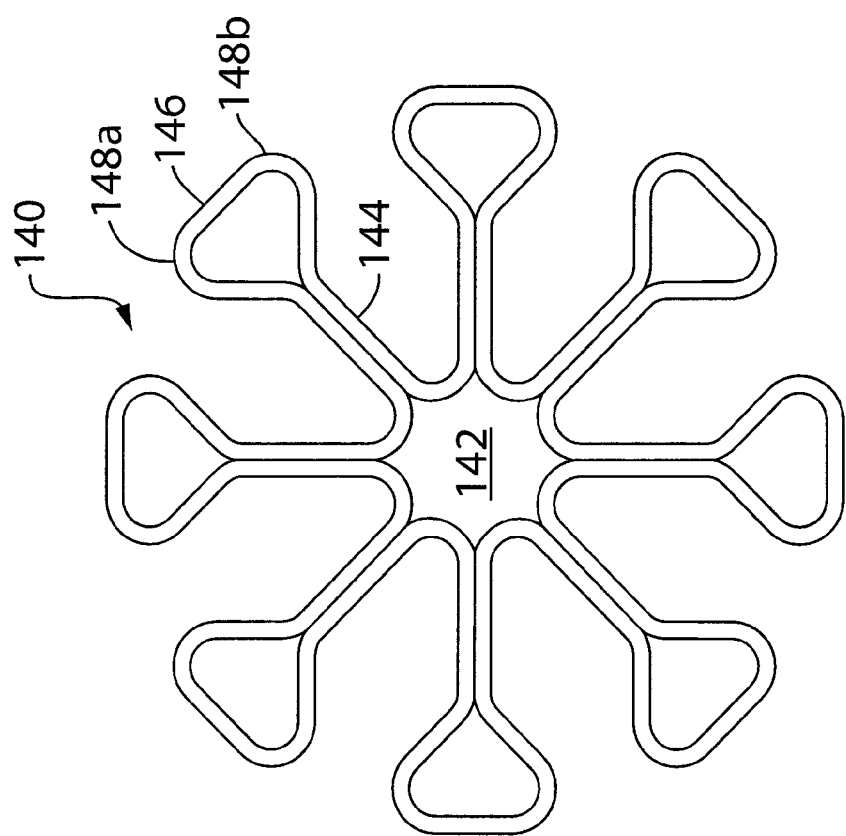

In yet another embodiment shown in FIG. 18, a crush can body 140 is shown having a generally small central hollow shape 142, however the arms, shown at 144 have relatively large distal hollow shapes 146 at their distal ends. The distal hollow shapes 146 are shown having a generally triangular cross sectional shape thereby including two apexes 148a and 148b in additional to the apexes associated with the proximal and distal ends of the arms 144.

The above described shapes in FIGS. 16-18 may be roll-formed, or may be formed by any other suitable means. The portions of the walls that are in abutment with each other may be joined to each other or may be unjoined. If joined, they may be joined by any suitable means.

While the above description constitutes a plurality of embodiments of the present invention, it will be appreciated that the present invention is susceptible to further modification and change without departing from the fair meaning of the accompanying claims

The invention claimed is:
1. A crush can for a vehicle frame, comprising:
a crush can body having a longitudinal axis and a cross-sectional shape that includes a plurality of outwardly pointing apexes and a plurality of inwardly pointing apexes; and
wherein the cross-sectional shape is a generally star-shaped polygon with adjacent ones of said inwardly pointing apexes being separated from one another by one of said outwardly pointing apex.

2. A crush can as claimed in claim 1, wherein the polygon has 6 outwardly pointing apexes and 6 inwardly pointing apexes.

3. A crush can as claimed in claim 1, wherein the polygon has 8 outwardly pointing apexes and 8 inwardly pointing apexes.

4. A crush can as claimed in claim 1, wherein the crush can body has a length and is tapered along the length.

5. A crush can as claimed in claim 4, wherein the crush can body has a large end and a small end, wherein, in use, the large end is rearward of the small end.

6. A crush can as claimed in claim 1, wherein the crush can body includes a first edge portion and a second edge portion which are welded together.

7. A crush can as claimed in claim 1, wherein the crush can body has a front end and a rear end, and wherein the crush can further includes a front plate mounted to the front end and a rear plate mounted to the rear end.

8. A crush can as claimed in claim 1, further comprising at least one buckling feature positioned at a selected position along the crush can body to initiate buckling at the selected position in the event of a sufficiently large axial compressive force on the crush can body.

9. A crush can as claimed in claim 8, wherein the at least one buckling feature includes a lateral deformation of at least one apex.

10. A crush can as claimed in claim 1, wherein the crush can body has a wall thickness and wherein each apex has a radius that is between 2 and 10 times the wall thickness.

11. A crush can as claimed in claim 4, wherein the crush can body has a wall thickness that is substantially constant along the length.

12. A crush can as claimed in claim 1, wherein the outwardly pointing apexes alternate with the inwardly pointing apexes.

* * * * *